United States Patent [19]

Edlinger et al.

[11] Patent Number: 5,675,691
[45] Date of Patent: Oct. 7, 1997

[54] DIFFRACTION GRATINGS IN OPTICAL WAVEGUIDE COMPONENTS AND PRODUCTION METHOD THEREOF

[75] Inventors: Johannes Edlinger, Frastanz, Austria; Helmut Rudigier, Bad Ragaz, Switzerland

[73] Assignee: Balzers Aktiengesellschaft, Germany

[21] Appl. No.: 570,161

[22] Filed: Dec. 11, 1995

[30] Foreign Application Priority Data

Dec. 9, 1994 [CH] Switzerland ............... 3743/94

[51] Int. Cl.$^6$ .................................................. G02B 6/124
[52] U.S. Cl. .................. 385/130; 359/566; 385/37; 430/290
[58] Field of Search .................. 385/31, 37, 123, 385/124, 129, 130; 359/3, 34, 566; 430/290

[56] References Cited

U.S. PATENT DOCUMENTS

| | | | |
|---|---|---|---|
| 4,725,110 | 2/1988 | Glenn et al. | 359/3 |
| 5,066,133 | 11/1991 | Brienza | 359/570 |
| 5,080,503 | 1/1992 | Najafi et al. | 385/1 |
| 5,104,209 | 4/1992 | Hill et al. | 385/37 X |
| 5,178,978 | 1/1993 | Zanoni et al. | 430/11 |
| 5,208,136 | 5/1993 | Zanoni et al. | 430/290 |
| 5,224,197 | 6/1993 | Zanoni et al. | 385/130 |
| 5,285,508 | 2/1994 | Chikuma | 385/30 |
| 5,287,427 | 2/1994 | Atkins et al. | 385/124 |

FOREIGN PATENT DOCUMENTS

| | | |
|---|---|---|
| 0 569 182 A1 | 11/1993 | European Pat. Off. . |
| 59-168403 | 9/1984 | Japan . |
| 93-040920 | 6/1991 | Japan . |
| 2 275 347 | 8/1994 | United Kingdom . |
| WO 86/01303 | 2/1986 | WIPO . |
| WO 91/15787 | 10/1991 | WIPO . |
| WO 93/18420 | 9/1993 | WIPO . |
| WO 94/17448 | 8/1994 | WIPO . |

OTHER PUBLICATIONS

Photosensitization of Optical Fiber and Silica–on–Silicon/Silica Waveguides, Bilodeau et al., Optics Letters, Jun. 15, 1993, vol. 18, No. 12, pp. 953–955.

Ultraviolet Laser Fabrication Of Ultrastrong Optical Fiber Gratings And Of Germania–Doped Channel Waveguides, V. Mizrahi et al., Appl. Phys. Lett 63 (13), 27 Sep. 1993, pp. 1727–1729.

Epitaxial Growth of $Bi_{12}GeO_{20}$ Thin–Film Optical Waveguides Using Excimer Laser Ablation, K. E. Youden et al., Appl. Phys. Lett 59 (16), 14 Oct. 1991, pp. 1929–1931.

*Primary Examiner*—John D. Lee
*Attorney, Agent, or Firm*—Evenson, McKeown, Edwards & Lenahan, P.L.L.C.

[57] ABSTRACT

A diffraction grating structure for coupling light into or out of a high refractive index waveguide layer on a carrier substrate is formed by irradiating the carrier substrate and/or the layer with UV laser light that is subject to simultaneous, spatially periodic intensity modulation. The modulation may be achieved, for example, by a biprism. The modulated UV light has the effect of periodically modulating the local refractive index of the waveguide layer or of the surface of the substrate to form the diffraction grating.

32 Claims, 5 Drawing Sheets

DIFFRACTION GRATINGS IN OPTICAL WAVEGUIDE COMPONENTS AND PRODUCTION METHOD THEREOF

BACKGROUND AND SUMMARY OF THE INVENTION

The present invention relates to a process for production of a diffraction grating structure and an optical waveguide component, and preferred uses or practical applications thereof.

As shown schematically in FIG. 1, light can be guided, in the same way as glass fibers, in a layer 2 on a planar substrate provided that the refractive index of the layer 2 is higher than the refractive index of the substrate 1 and the refractive index of the environment 3, and the optical losses of the entire system 1, 2, 3 are sufficiently low.

With a suitable choice of layer thickness and refractive index of the substrate 1, the layer 2 and the environment 3, dielectric layers with high refractive index and waveguiding properties on a carrier substrate 1 have a field 4 which is of high intensity and evanescent, or transient, in the environment. The evanescent field is the part of the field of the transmitted mode which fades into the surrounding medium. The evanescent field of layers with high refractive indices is used in many ways in analytical physics and chemistry. The ambient medium 3 usually either contains, or is itself, the sample to be analyzed. In contrast, in optical fibers or planar waveguides used in communications technology, the evanescent intensity in the environment is very low.

To excite a transmitted light wave, light, preferably a laser beam 11, must be input into or output from the layer. The literature (P. K. Tien, Appl. Optics, Vol 10, Nov 1971, pages 2395–2413) describes three ways of inputting light into a waveguide layer, i.e. coupling through prisms, via the front surface or using a coupling grating 6. Of these ways, input by coupling gratings appears the most favorable for analytical mass applications as the complex mechanical adjustments can be omitted. The function of a coupling grating is to input part of the incident light into the high refractive layer by diffraction. The precise action of grating couplers is described for example in T. Tamir, S. T. Peng, Appl. Phys. 14, 235–254 (1977).

A dielectric layer of high refractive index is a layer with a refractive index at least 10% higher than the refractive index of the substrate.

For commonly used substrates with a refractive index of $N_{substrate} \approx 1.5$, the refractive index of the layer should be N>1.65, and preferably N>1.75. The materials used are the oxides $TiO_2$, $Ta_2O_5$, $HfO_2$, $Al_2O_3$, $Nb_2O_5$, $Y_2O_3$, $ZrO_2$. Nitrides of Al, Si and Hf are suitable for these applications as are their oxynitrides. Also mixtures, e.g. $TiO_2$ and $SiO_2$, can be used with the possibility of adjusting the refractive index according to the mixture ratio. If a low refractive index material such as $SiO_2$ is added to the high refractive index dielectric layer, the quantity added must be such that the layer affected remains "high refractive".

Similarly, the waveguide may be not only a single layer of one of the high refractive index materials but also a system of several layers including at least one of the high refractive index layers. In particular, for example, it is possible to introduce between the substrate and the high refractive index layer and/or between the environment and the high refractive index layer, thin intermediate layers of $SiO_2$ in accordance with WO 92/19976.

The term waveguide refers to the layers in which a transmitted mode in the layer can be excited with losses of <50 dB/cm and preferably <10 dB/cm.

Suitable substrate materials are, for example, silica, various glasses, ceramic materials or plastics, e.g. polycarbonate, PMMA, polystyrene etc.

The spacing period necessary for coupling gratings is of the order of the wavelength of the light used, in particular between 300 nm and 1000 nm for visible light and correspondingly more for the infra-red range (see T. Tamir, id.).

FIGS. 2a, 2b and 2c illustrate known optical arrangements that act as coupling gratings.

FIG. 2a shows a flat substrate 1 to which is applied a waveguide layer 2, in which a surface relief which acts as the coupling grating is etched. Structures such as shown in FIG. 2b, in which a patterned substrate is provided with a waveguide layer 2, also act as coupling gratings. FIGS. 2a and 2b schematically show other industrial embodiments, e.g. according to EP 0226604 A.

FIG. 2a shows an arrangement in which the substrate 1 is first coated. Then, for example, by photolithography and subsequent etching, the layer thickness of the high refractive index layer 2 is periodically varied. This produces a "grating in the waveguide". The grating period A is 750 nm and the grating depth d approximately 10 nm. The layer is a 155 nm thickness of $Ta_2O_5$ with a refractive index of N=2.2 on a substrate of C7059 with a refractive index of $N_{substrate}=$ 1.5315.

FIG. 2b shows another embodiment, in which the substrate is first structured (a "grating in the substrate") and then coated. The grating depth is 5–10 nm.

Examples of applications for integrated optical sensors with grating couplers are for example:

- in sensors with grating couplers (EP 0226604 B1);
- in sensors which use a holographic grating with a coated substrate (WO 93/01487, EP 0482377 A2);
- in phase-sensitive sensors for coupling laser light into and out of a Mach-Zehnder interferometer (EP 0487992 A2);
- in coupling laser light into and out of sensors that generate a signal proportional to the mode intensity, e.g. absorption, in order to measure the absolute intensity in a waveguide;
- in the form of a combination of possible sensor principles with a spread of coupling gratings on more general diffractive structures (R. E. Kunz, proc. SPIE, Vol. 1587 (1992) or WO 92/19976).

As shown in section in FIG. 3a and in a schematic perspective view in FIG. 3b, the input grating 6 or an output grating 7 or the surface 8 containing the transmitted mode can act as sensor surfaces. Also, according to WO 93/01487, a holographic grating can act as a sensor surface.

FIG. 4 shows an example of a Mach-Zehnder interferometer with input and output gratings 6 and 7, respectively.

The production process of such integrated optical sensors can be divided into two parts:

1. Coating the carrier substrate with a layer of a defined refractive index and defined layer thickness.
2. Formation of the coupling grating.

Relatively low cost solutions are available for coating, such as PVD processes (vapor deposition, sputtering, etc.), CVD, PECVD, ion plating or SOL-GEL processes. The majority of costs are incurred at present in the production of the coupling grating.

In a known process for producing the coupling grating, surface relief structures as in FIGS. 2a, 2b, 3 and 4 are produced on substrates of mineral glass or ceramic by photolithographic techniques. The coated substrate is coated with photosensitive resist, then exposed to light and developed and finally etched. In the final step, the photosensitive resist is removed again. This technique is expensive because of the number of operations and the equipment required (cleaning, resist accelerator, exposure device, etching system etc.).

R. Kunz, Proc. SPIE Vol 1587 (1992), proposes producing plastic coupling gratings which are then coated. This has the advantage that cheap replication techniques are available for plastic substrates, e.g. embossing, injection molding or casting.

Plastic as a substrate material also has disadvantages. For example, the mechanical properties of the substrate are known less precisely than those of glass, are less stable and differ considerably from the mechanical properties of high refractive index layers. The thermal expansion coefficient of the plastics is approximately one order of magnitude greater than those of most high refractive index dielectrics.

The various fabrication methods for plastics also have disadvantages. For example, embossing requires expensive dies or masher stamps. Also, the fabrication methods can induce surface irregularities that have a disadvantageous effect on the waveguiding properties. The reproducibility of sub-micron structures in plastic is also unknown.

The production of surface relief structures in polymers by UV laser ablation (brochure by EXITEC Limited, Hanborough Park, Long Hanborough, OX8 8LH, UK) is also known. However, the gratings produced to date are approximately 100 nm deep, i.e. an order of magnitude deeper than those required for use as coupling gratings.

Also known is the periodically modulated exposure of photosensitive substrate materials with UV light in order to produce refractive index modulations as shown in FIG. 2c, with areas 9 and 9a of different refractive indices in substrate 1. To this end, special photosensitive glasses and polymers (photosensitive resists) are also known. These special materials are, however, also expensive.

With regard to glass fibers, it is known in the literature that the optical properties of glass fibers change when irradiated with UV laser light (A. M. Glass, Physics Today, Oct 1993, pages 34–38; K. O. Hill et al, Appl. Phys. Lett. 32 (10, 15 May 1978, p 647). The change essentially consists of a time-stable change in refractive index ($\Delta n \approx 10^{-2}$) of the Ge-doped $SiO_2$ core of the fiber. Suitable illumination of the fiber with interfering excimer laser beams can be used to generate phase gratings directly in the core of the glass fiber. Using one or more phase gratings, a number of components can be produced, namely reflectors, resonators, grating couplers, multiplexers. Such components are designed for wave lengths 1330 nm and 1550 nm. The change in refractive index is linked to the Ge-doping, without which the process does not function. The glass fiber core is embedded in a low refractive index sheath. Components produced in this way are used in communications technology.

Reference is made to the following publications as background information:

(1) "Applied Physics Letters", Vol. 63, No. 13, 27 Sep. 1993, p 1727–1729, XP 000397774, Mizrahi V et al, "Ultraviolet laser fabrication of ultra-strong optical fiber gratings and of germania-doped channel waveguides";

(2) Patent Abstracts of Japan, Vol. 009, no. 024 (P-331) 31 Jan. 1985, and JP-A-59/168403 (Sumitomo Denki Kogyo KK), 22 Sep. 1984;

(3) EP 0569182 A (American Telephone & Telegraph), 10 Nov. 1993;

(4) U.S. Pat. No. 5,178,978 (Zanoni Raymound et al.) 12 Jan. 1993;

(5) Database WPI, Section Ch, Week 9305, Derwent Publications Ltd., London, GB; Class A89, AN 93-040920, and JP 04/366637 (Komatsu Seiren KK), 18 Dec. 1992;

(6) "Applied Physics Letters", Vol. 59, No. 16, 14 Oct. 1991, pp 1929–1931, XP 000257407, Youden K. E. et al, "Epitaxial growth of BI12GE020 thin film optical waveguides using excimer laser ablation".

An object of the present invention is to provide an inexpensive process suitable for the mass production of input/output gratings in high refractive index dielectric layers or layer systems (i.e. not in organic layers such as photosensitive resists) with the following properties:

The geometry can be any physical surface, but preferably a planar surface.

No Ge-doping, as in glass fibers, is required for the high refractive index waveguide layer; various high refractive index dielectric layer materials can be fabricated directly without doping.

The gratings can work with light from 400 nm to 1200 nm, e.g. helium-neon light at 633 nm.

The process should be as independent as possible from the substrate material; mineral glass, ceramic or plastic should be usable as the substrate.

Substrate materials not known to be photosensitive can be used.

The process should allow formation of the grating on the substrate to be subsequently coated, or structuring of the substrate already coated.

In the production of coupling gratings by surface ablation, it should be possible to select a grating depth less than 20 nm, preferably less than 10 nm.

The grating surface should be freely selectable, preferably from $1 \times 1$ mm$^2$ to $8 \times 8$ mm$^2$.

The optical waveguide components according to the invention can be suitable for sensory analysis.

The foregoing objects have been achieved according to the present invention by providing a process for the production of a diffraction grating structure on a carrier substrate for coupling light into and out of at least one high refractive index dielectric layer. The high refractive index dielectric layer and/or carrier substrate are irradiated with UV laser light that is subject to simultaneous spatially periodic intensity modulation.

The present invention further provides a waveguide component comprising a carrier substrate coated with at least one dielectric high refractive index waveguide layer; and a diffraction grating structure formed by periodic modulation of the refractive index of the waveguide layer and/or of the carrier substrate.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

In the process according to the present invention, UV laser light, preferably excimer laser light, that is subject to simultaneous, spatially periodic intensity modulation modifies the layer thickness and/or the complex refractive index in the layer and/or in the carrier substrate in a spatially periodic manner. The optical waveguide component according to the invention, as shown in FIG. 2d, has a diffraction grating structure formed by periodic change of the refractive index of the high refractive index dielectric layer and/or a carrier substrate not known to be photosensitive.

"Simultaneous spatial modulation" refers to modulation over a region in which a surface is processed simultaneously without scanning. Sequential processing by means of one or more pulses is thus simultaneous spatial processing in this sense.

Figure 5:
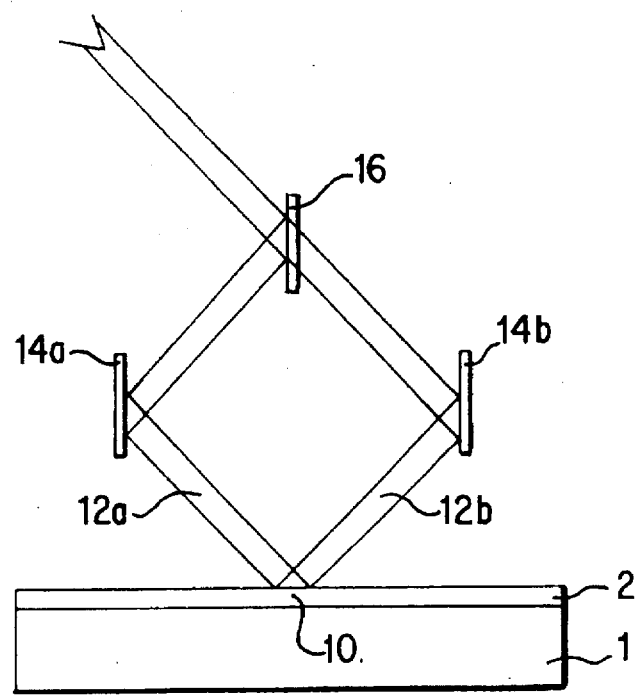
FIG. 5 is a schematic diagram showing a first process according to the present invention.

According to FIG. 5, the simultaneous spatial modulation of the UV light in area 10 of a carrier substrate 1 coated with layer 2 as shown, or on the surface of carrier substrate 1 before being coated with layer 2, is achieved by holographic exposure with two or more coherent laser light beams 12a, 12b. The separation and subsequent overlaying of two coherent beams, as shown schematically with mirrors 14a, 14b or with a beam splitter 16, is described in detail in the literature, e.g. in M. Born, E. Wolf "Principles of Optics", 6th ed., Pergamon Press, page 260 ff.

Figure 6:
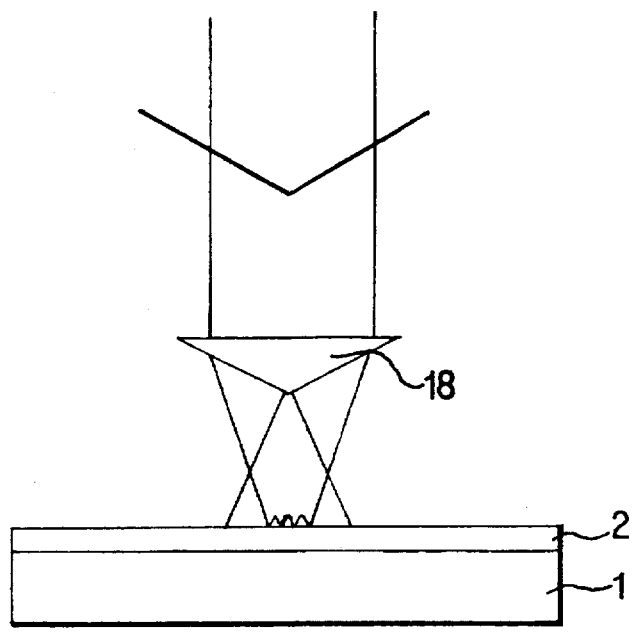
FIG. 6 is a schematic diagram showing a second process according to the present invention.

As shown in FIG. 6, a Fresnel biprism 18 can be used to divide and subsequently overlay the beam to form the grating structure in the required area of the carrier substrate 1 and/or layer 2.

Figure 7:
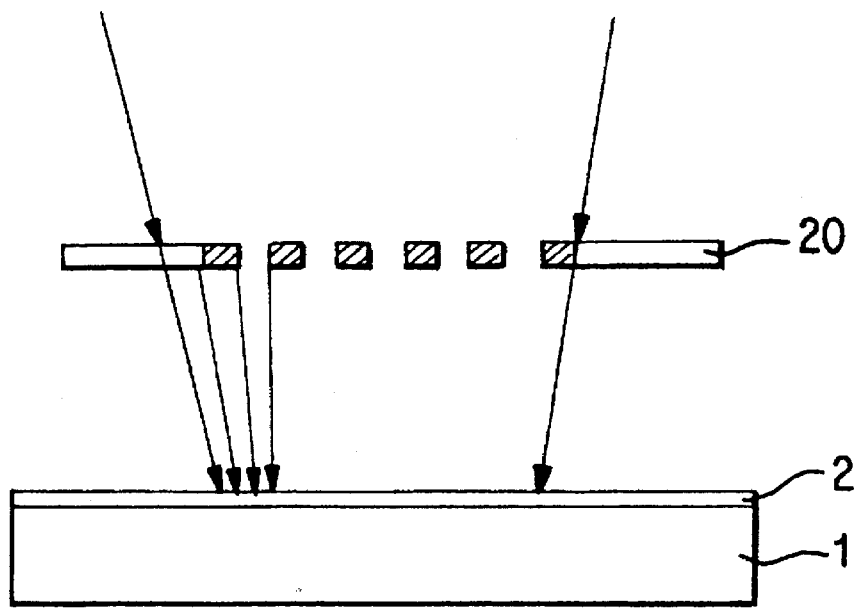
FIG. 7 is a schematic diagram showing a third process according to the present invention.

Another currently preferred procedure is shown in FIG. 7, according to which a coated substrate 1 (shown) and/or an uncoated substrate (not shown) is exposed to the simultaneously spatially modulated UV light by irradiation through a mask 20. Because the layer and/or carrier substrate are exposed to simultaneously impinging, spatially modulated UV light radiation, a permanent local modulation of the refractive index is achieved on the layer and/or carrier substrate, alternatively or in addition an ablation of the material of the layer and/or surface of the uncoated carrier substrate 1.

Because UV laser light, in particular excimer laser light, is used rather than another intense light source, the thermal stress on the carrier substrate and layer material can be kept very low. This ensures independence from the mechanical and thermoplastic properties of the substrate, see Gerhardt, Lambda Physik Science Report, June 1991, M. C. Gower et al, Proc. SPIE, Vol 1985, 1992, page 132.

The process according to the invention allows the production of curved gratings or gratings with locally varying periods or the superposition of gratings of different periods, for example a grating in the substrate surface area with a first period and a second grating in or on the layer with a second period.

Figure 1:
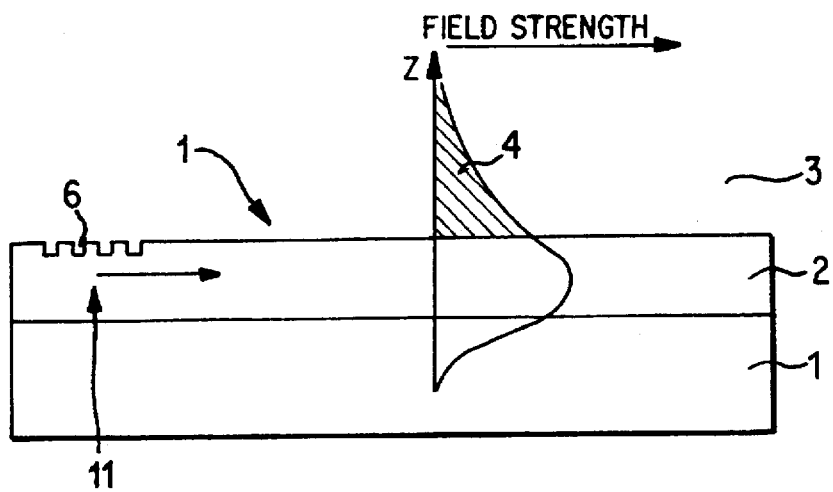
FIG. 1 is a schematic cross-sectional view of a known waveguide structure with a diffraction grating to explain the conditions occurring in waveguide transmission.
Figure 2A:
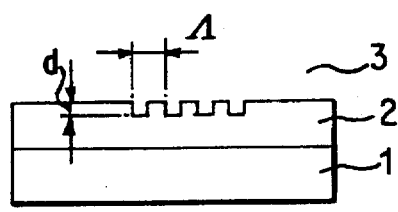
FIGS. 2a to 2c show known diffraction grating structures in a waveguide according to FIG. 1.
Figure 2B:
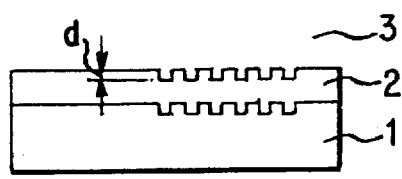
Figure 2D:
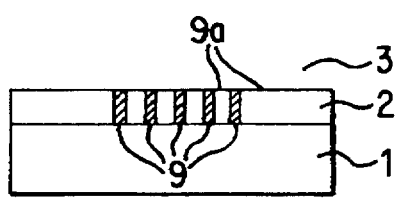
FIG. 2d shows a first embodiment diffraction grating structure according to the present invention.
Figure 2C:
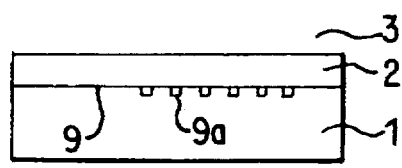
Figure 3A:
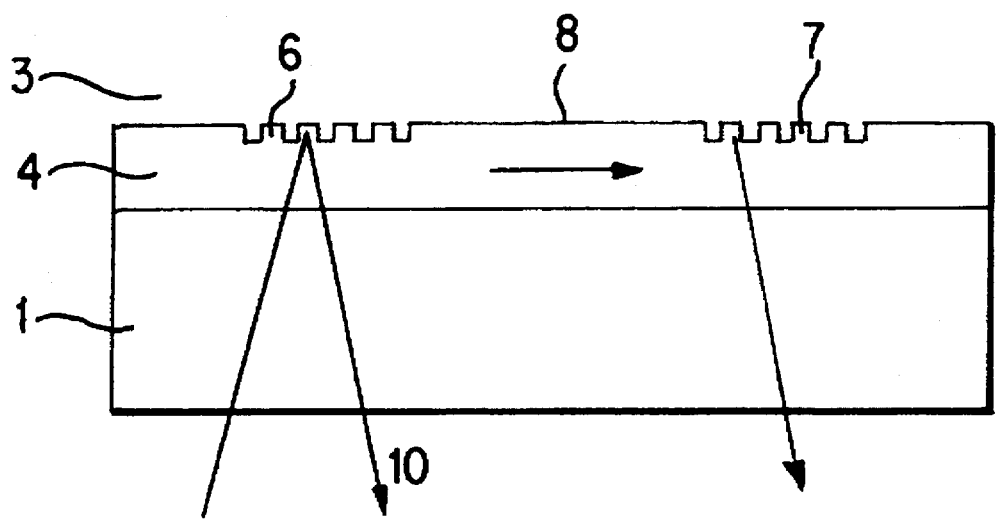
FIGS. 3a and 3b are schematic views respectively in cross section and perspective views of a known waveguide structure.
Figure 3B:
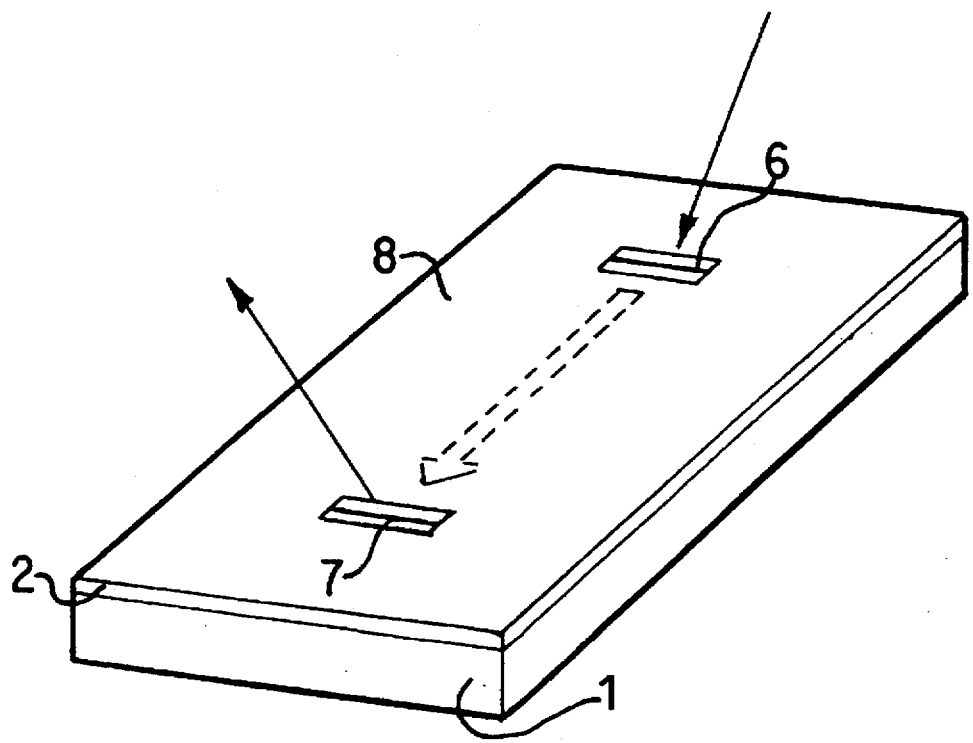
Figure 4:
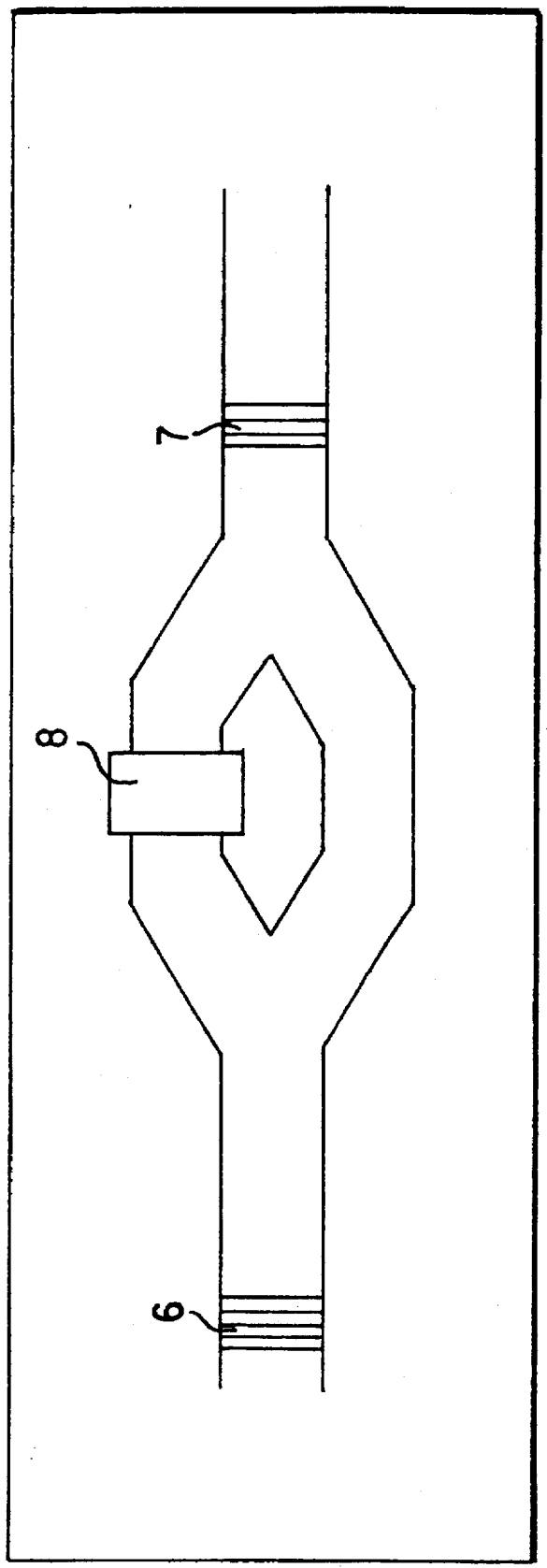
FIG. 4 is a front schematic view of a known interferometer structure.

For the production of coupling gratings by profiling, the grating depth d according to FIGS. 2a and 2b is generally critical as the coupling efficiency depends greatly on this. Typical grating depths for coupling gratings are less than 10 nm. If the substrate, e.g. C7059 glass, and a layer, for example $Tio_2$, applied thereto, have different ablation thresholds, this allows precise setting of the grating depth by the use of "sacrificial layers". The sacrificial layer is first applied to the substrate in a thickness corresponding to the required grating depth, where the layer thickness in the coating can be adjusted very precisely, for example with an accuracy of 0.5 nm.

Figure 8:
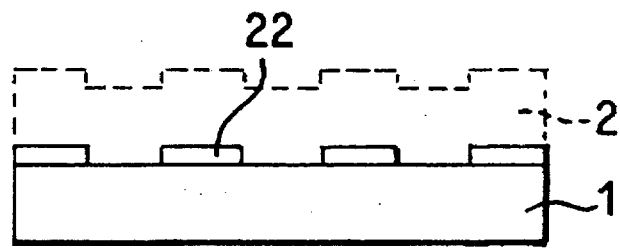
FIG. 8 is a schematic view of another embodiment of the invention using a sacrificial layer.

If this thin layer is now ablated to the substrate but no deeper because of the higher ablation threshold of the substrate, the grating generated in this way can then be overlaid with the optical waveguide in the required layer thickness as shown in dotted lines in FIG. 8, with the ablated sacrificial layer 22.

Figure 9:
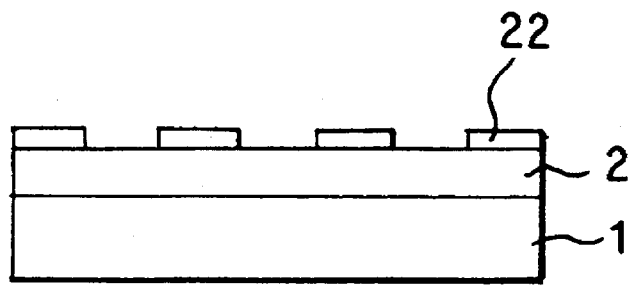
FIG. 9 is a schematic view of yet another embodiment using a sacrificial layer.

As shown in FIG. 9, a sacrificial layer 22 can be applied analogously to the waveguide layer 2 if the material of this layer 2 has an ablation threshold higher than that of the sacrificial layer 22.

EXAMPLE 1

| | |
|---|---|
| Carrier substrate: | C7059 glass |
| Coating: | $Ta_2O_5$ layer thickness 155 nm |
| Radiation source: | Excimer laser, 248 nm |
| Modulation technique: | Fresnel biprism (FIG. 6) |
| Energy density on substrate: | 50 mJ/cm$^2$ |

By ablation of the $Ta_2O_5$ layer, a diffraction grating is produced with a period $\Lambda$ of 375 nm and a grating depth of 5 nm. The grating structure was triangular in cross section.

The diffraction efficiency with light of wavelength 633 nm was greater than 0.1%, i.e. approximately 2%.

EXAMPLE 2

| | |
|---|---|
| Carrier substrate: | C7059 glass |
| Coating: | $TiO_2$, layer thickness 125 nm |
| Radiation source: | Excimer laser 248 nm |
| Modulation technique: | Fresnel biprism (FIG. 6) |
| Energy density on substrate: | 50 mJ/cm$^2$ |

By ablation, a diffraction grating with a grating area of 8×8 mm$^2$ and a grating period of 440 nm was produced with a grating depth of 1 nm. The diffraction efficiency for light with $\lambda$=633 nm was as in Example 1.

EXAMPLE 3

Instead of substrate C7059 used in Example 2, quartz glass was used and the diffraction grating in Example 2 was formed with a surface of 1×8 mm$^2$. The grating ran parallel to the long edge of the surface.

Here too the diffraction efficiency was as given in Example 1.

From a comparison of Examples 1, 2 and 3, the following is clear:

1. The production of the diffraction grating according to the present invention by ablation of the layer is largely independent of the carrier substrate used (glass in Examples 1 and 2; quartz in Example 3; see also plastic in Examples 6 below).

2. By limiting the impingement area of the spatially modulated laser beam, preferably by simply providing an aperture arrangement in the path of the modulated laser beam, it is possible to produce both a relatively large grating area (Example 2), i.e. substantially greater than the impingement area of a laser beam to be input (ø usually approx 0.8 mm), and also (Example 2) a grating surface which in the only relevant direction of extension, namely transverse to the grating strip, corresponds approximately to the beam diameter. With a grating surface having a dimension transverse to the grating profile that corresponds substantially to that of the input laser beam, the input light propagates in the waveguide layer e.g. to a predetermined output point.

A large grating area can, as is known, act in the sense of WO 93/01487 as a sensor surface where the mechanical positioning of the laser beam to be input is not critical and a part of the input light can be output again on the same grating.

Both processes are used for analytical work depending on the technique used.

EXAMPLE 4

Using the same carrier substrate, the same layer and the same radiation source as in Example 3 above, again using a Fresnel biprism (FIG. 6) and with an energy density on the substrate of 40 mJ/cm$^2$, a diffraction grating with a grating area of 8×8 mm$^2$ on the coated carrier substrate was produced without visible ablation of the surface.

The diffraction efficiency was slightly lower than in Example 3, but was still far above 0.1%, namely approximately 1%.

From this current example, if is clear that when the energy density of the modulating beam falls below the ablation threshold of the layer material (e.g. from 50 to 40 mJ/cm$^2$), an efficient diffraction grating is nonetheless produced. Quartz glass, like C7059 glass, is not known to be an inherently photosensitive material.

The only possible reasonable conclusion from this observation is that the refractive index of the layer and/or on a substrate not known to be inherently photosensitive or at the interface between the substrate and the layer is modulated spatially by the modulating beam.

EXAMPLE 5

| Carrier substrate: | Quartz glass |
| --- | --- |
| Sacrificial layer: | 3 nm TiO$^2$ on the carrier substrate |
| Radiation source and modulation technique: | as in Example 3 |

By ablation of the sacrificial layer, a diffraction grating was produced with a grating depth of 3 nm and a grating period of 440 nm.

EXAMPLE 6

| Carrier substrate: | Polycarbonate |
| --- | --- |
| Coating: | On the substrate first 10 nm SiO$^2$ then 150 nm TiO$^2$ |
| Radiation source: | Excimer laser, 248 nm |
| Modulation technique: | Fresnel biprism (FIG. 6) |

By ablation of the TiO$_2$ layer, a diffraction grating with depth 5 nm was produced. The diffraction efficiency was as given in Example 2.

The SiO$_2$ intermediate layer was provided in order to be able to apply the waveguide layer, here TiO$_2$, to the polycarbonate substrate.

Additional Examples

The ablation threshold of TiO$_2$ was not reached in the modulating laser beam, and as a result a diffraction grating according to Example 4 was produced by modulation of the refractive index.

Also before the SiO$_2$ coating in Example 6, the grating profiling was generated by ablation on the polycarbonate surface, with a grating depth of 5 nm and the grating period of 375 nm and only then were the SiO$_2$ and the Tio$_2$ layers respectively applied. The diffraction efficiency of the resulting grating was as given in Example 2. The profiling of the polycarbonate surface had formed on the surface of the TiO$_2$ layer through the SiO$_2$ and TiO$_2$ layers, as could be checked.

It is surprising that a grating depth of 5 nm and the given periods can be produced in polycarbonate, a plastic, as is possible with the procedure according to the invention. It is particularly surprising that this extremely fine profiling can be formed despite further coatings. In all diffraction gratings according to the examples given above, an SiO$_2$ layer could be applied over the waveguide layer without any significant effect on the diffraction efficiency of the diffraction grating.

Thus on a diffraction grating produced according to the invention, it is possible for example to prepare reliable sensor surface materials, e.g. for analytical chemistry. If a low refractive index layer is provided, e.g. preferably of SiO$_2$, its thickness is preferably selected at maximum 20 nm.

The waveguide layer or a layer of lower refractive index material deposited thereon, in particular SiO$_2$, can be deposited in the known manner either porously or preferably densely in order to produce, as is known from analysis, in the first case, a highly sensitive non-selective sensor and in the second case a highly selective, less sensitive sensor. In this context see R. E. Kunz, C. L. Du et al, Eurosensors 4, Paper B6.1, 1-3.10.1990, Karlsruhe.

Also a short pulse of the modulating laser beam of approximately 20 ns was sufficient to generate the grating described. This has the essential advantage that any interference generated mechanically, such as for example from mechanical vibrations in the production workplace etc., has no effect on the relative position of the workpiece on which the grating is to be produced and on the modulating laser beam. With sufficient mechanical stability of the optical system, therefore a pulse series can be used.

It is also quite possible within the scope of the present invention to create a grating on a flat substrate for inputting and outputting light with a wavelength of 400 nm to 1200 nm, preferably under 1000 nm, and, for example, to dope the waveguide layer with Ge.

By producing a locally variable period of the modulating laser beam, gratings with locally varying periods can be produced. By targeted curved design of the modulation pattern of the modulating laser beam, curved gratings, in particular combined with locally varying grating periods, can now be produced.

If a material with known low refractive index is added to the dielectric high refractive index layer as a material component, this is only to the extent that the layer remains high refractive index as defined.

Although not essential, the layer material can be semiconductor-doped in order to achieve magnification of the sensitivity in the UV range. Tio$_2$, Ta$_2$O$_5$, HfO$_2$, Al$_2$O$_3$, Nb$_2$O$_5$, Y$_2$O$_3$, ZrO$_2$, nitrides of Al, Si, Hf or their oxynitrides or mixtures of the materials are candidates as layer material components.

Although the invention has been described and illustrated in detail, it is to be clearly understood that the same is by way of illustration and example, and is not to be taken byway of limitation. The spirit and scope of the present invention are to be limited only by the terms of the appended claims.

What is claimed is:

1. A process for producing a diffraction grating structure for coupling light into and/or out of at least one dopant-free high refractive index dielectric layer on a dopant-free carrier substrate, consisting of the step of irradiating at least one of the high refractive index dielectric layer and carrier substrate with UV laser light with simultaneous spatially periodic intensity modulation.

2. The process according to claim 1, wherein the intensity modulation is generated by at least two mutually interfering UV laser beams.

3. The process according to claim 1, wherein the intensity modulation is mask structure generated.

4. The process according to claim 1, wherein the UV laser light is generated by at least one excimer laser.

5. The process according to claim 1, wherein the UV laser light is pulsed at least once.

6. The process according to claim 5, wherein a duration of the at least one pulse is less than 1 µs.

7. The process according to claim 5, wherein a duration of the at least one pulse is approximately 20 ns.

8. The process according to claim 1, wherein the refractive index of at least one of the high refractive index layer and a surface region of the carrier substrate is spatially modulated by the laser light.

9. The process according to claim 1, wherein the layer thickness of the high refractive index layer is ablation modulated by the laser light.

10. The process according to claim 1, wherein the surface of the substrate is ablation modulated by the laser light before applying the high refractive index layer.

11. The process according to claim 1, wherein materials used at least as one component of the high refractive index dielectric layer are selected from the group essentially consisting of $TiO_2$, $Ta_2O_5$, $HfO_2$, $Al_2O_3$, $Nb_2O_5$, $Y_2O_3$, $ZrO_2$ and the nitrides and oxynitrides of Al, Si, Hf.

12. The process according to claim 1, further comprising the step of mixing a low refractive index material into a high refractive index material of the high refractive index layer.

13. The process according to claim 12, wherein the low refractive index material is $SiO_2$.

14. The process according to claim 1, further comprising the step of applying a layer of low refractive index material, with a thickness of no greater than 20 nm between at least one of the high refractive index layer and the substrate and the high refractive index layer and the environment.

15. The process according to claim 13, wherein the low refractive index material is $SiO_2$.

16. The process according to claim 1, wherein the grating structure is produced on a generally flat substrate for coupling light of 490 nm $\leq \lambda$ 1200 nm.

17. The process according to claim 1, wherein a carrier substrate material is selected from the group consisting essentially of a glass, a ceramic, and a predominantly organic material.

18. The process according to claim 1, further comprising the steps of applying a sacrificial layer of predetermined layer thickness with an ablation threshold lower than an ablation threshold of the carrier substrate to the carrier substrate, and ablating the sacrificial layer by the light irradiated to the carrier substrate.

19. The process according to claim 1, further comprising the steps of applying a sacrificial layer of predetermined layer thickness with an ablation threshold lower than an ablation threshold of the high refractive index layer to the high refractive index layer, and ablating the sacrificial layer by the light irradiated to the high refractive index layer.

20. The process according to claim 1, wherein the grating is produced with variable periods or as a curved grating.

21. The process according to claim 1, wherein the grating surface is determined by at least one aperture in the UV laser beam path.

22. A waveguide arrangement comprising a waveguide section and at least one light input/output area, said waveguide section and said area comprising a carrier substrate of a first material and thereon at least one dielectric high refractive index waveguide layer of a second material, said first and second materials being selected exclusively according to predetermined requirements for said waveguide section so as to be dopant-free, said input/output area comprising a diffraction grating structure formed by periodic modulation of a refractive index of at least one of said first and second materials.

23. A waveguide component comprising a dopant-free carrier substrate coated with at least one dopant-free dielectric high refractive index waveguide layer; and a diffraction grating structure formed by periodic modulation of the refractive index of at least one of the waveguide layer and of the carrier substrate.

24. The waveguide component according to claim 23, wherein material of the substrate is non-photosensitive.

25. The waveguide component according to claim 24, wherein a period of the diffraction grating is sized for coupling at least into and out of the waveguide layer light with a wave length of 400 nm$\leq \lambda \leq$1200 nm.

26. The waveguide component according to claim 23, wherein a period of the diffraction grating is sized for coupling at least into and out of the waveguide layer light with a wave length of 400 nm$\leq \lambda \leq$1200 nm.

27. The waveguide component according to claim 23, wherein the high refractive index layer has a refractive index of N$\geq$1.65 for 633 nm light.

28. The waveguide component according to claim 23, wherein material of the high refractive index layer comprises $TiO_2$, $Ta_2O_5$, $HfO_2$, $Al_2O_3$, $Nb_2O_5$, $Y_2O_3$, $ZrO_2$, the nitrides and oxynitrides of Al, Si, Hf and mixtures of one or more of the foregoing compounds.

29. The waveguide component according to claim 23, wherein a low refractive index layer is arranged at least one of between the high refractive index layer and the carrier substrate, and the high refractive index layer and the environment.

30. The waveguide component according to claim 29, wherein the low refractive index layer is $SiO_2$ and has a thickness of no greater than 20 nm.

31. The waveguide component according to claim 23, wherein the carrier substrate consists of one of a glass, a ceramic and a plastic.

32. A process for producing a waveguide arrangement with a waveguide section and at least one light input/output area, comprising the steps of:

providing a carrier of a first undoped material for said section and for said area;

applying a layer of undoped high-refractive-index, dielectric second material on said carrier and along said section and said area;

selecting said first and said second undoped materials exclusively according to predetermined requirements for said waveguide section; and generating a diffraction grating structure by applying simultaneously and spatially periodic intensity modulated UV-laser light to said area.

* * * * *